United States Patent
Lang et al.

(10) Patent No.: US 9,987,914 B2
(45) Date of Patent: Jun. 5, 2018

(54) MASS-COUPLING ARRANGEMENT FOR A VEHICLE

(71) Applicant: Robert Bosch GmbH, Stuttgart (DE)

(72) Inventors: Florian Lang, Stuttgart (DE); Klaus Reymann, Karlstadt (DE); Steffen Derhardt, Gerlingen (DE); Thomas Friedrich, Ingersheim (DE); Volker Doege, Dischingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/509,582

(22) PCT Filed: Jul. 15, 2015

(86) PCT No.: PCT/EP2015/066121
§ 371 (c)(1),
(2) Date: Mar. 8, 2017

(87) PCT Pub. No.: WO2016/037736
PCT Pub. Date: Mar. 17, 2016

(65) Prior Publication Data
US 2017/0253114 A1  Sep. 7, 2017

(30) Foreign Application Priority Data
Sep. 9, 2014  (DE) .......... 10 2014 218 023

(51) Int. Cl.
*B60K 1/04* (2006.01)
*F16F 9/00* (2006.01)
(Continued)

(52) U.S. Cl.
CPC .......... *B60K 1/04* (2013.01); *F16F 9/006* (2013.01); *F16F 9/18* (2013.01); *F16F 9/22* (2013.01);
(Continued)

(58) Field of Classification Search
CPC .......... B60Y 2306/01; B60L 3/0007; B60K 2001/0494; F16F 2222/12
See application file for complete search history.

(56) References Cited

U.S. PATENT DOCUMENTS 5,249,826 A * 10/1993 Bell ............ B60N 2/4221
280/753
5,518,271 A * 5/1996 Bell ............ B60N 2/4221
180/274
(Continued)

FOREIGN PATENT DOCUMENTS

DE  19738620  12/1998
DE  102012204856  10/2013
(Continued)

OTHER PUBLICATIONS

International Search Report for Application No. PCT/EP2015/066121 dated Oct. 7, 2015 (English Translation, 3 pages).

*Primary Examiner* — Brian L Swenson
(74) *Attorney, Agent, or Firm* — Michael Best & Friedrich LLP

(57) ABSTRACT

The invention relates to a method for operating a ground-coupling arrangement for a vehicle comprising a ground receiving element for receiving a grounding object, wherein the ground receiving element is at least partially filled with a fluid which contacts the grounding object; at least one coupling means which is designed for coupling the grounding object to the ground receiving element by means of the fluid and thus to a vehicle structure that is rigidly connected to the vehicle, and/or for at least partially decoupling of the ground receiving element from the vehicle structure; and a hydraulic line which connects the coupling means to the fluid, wherein the grounding object compresses the fluid in the case of a crash and the coupling means directs the fluid out of the ground receiving element or reroutes the fluid in the ground receiving element.

10 Claims, 3 Drawing Sheets

(51) Int. Cl.
*F16F 9/18* (2006.01)
*F16F 9/22* (2006.01)
*B60K 1/00* (2006.01)

(52) U.S. Cl.
CPC ..... *B60K 2001/005* (2013.01); *B60Y 2306/01* (2013.01); *F16F 2222/12* (2013.01)

(56) References Cited

U.S. PATENT DOCUMENTS

| | | | | |
|---|---|---|---|---|
| 6,148,970 | A * | 11/2000 | Akad | B60R 19/36 188/266 |
| 6,158,538 | A * | 12/2000 | Botzelmann | B60K 1/04 180/65.1 |
| 8,540,282 | B2 * | 9/2013 | Yoda | B60K 1/04 180/232 |
| 9,309,982 | B2 * | 4/2016 | Akiyama | B60R 16/00 |
| 9,776,588 | B2 * | 10/2017 | Wolkenstein | B60R 21/0134 |
| 2004/0173422 | A1 * | 9/2004 | Deshmukh | F16F 9/003 188/267.2 |
| 2010/0193305 | A1 * | 8/2010 | Suciu | F16F 9/003 188/268 |
| 2015/0053492 | A1 * | 2/2015 | Kolatschek | B60K 1/04 180/68.5 |
| 2016/0167544 | A1 * | 6/2016 | Barbat | B60K 1/04 180/68.5 |

FOREIGN PATENT DOCUMENTS

| | | |
|---|---|---|
| EP | 0197316 | 10/1986 |
| EP | 1394439 | 3/2004 |

* cited by examiner

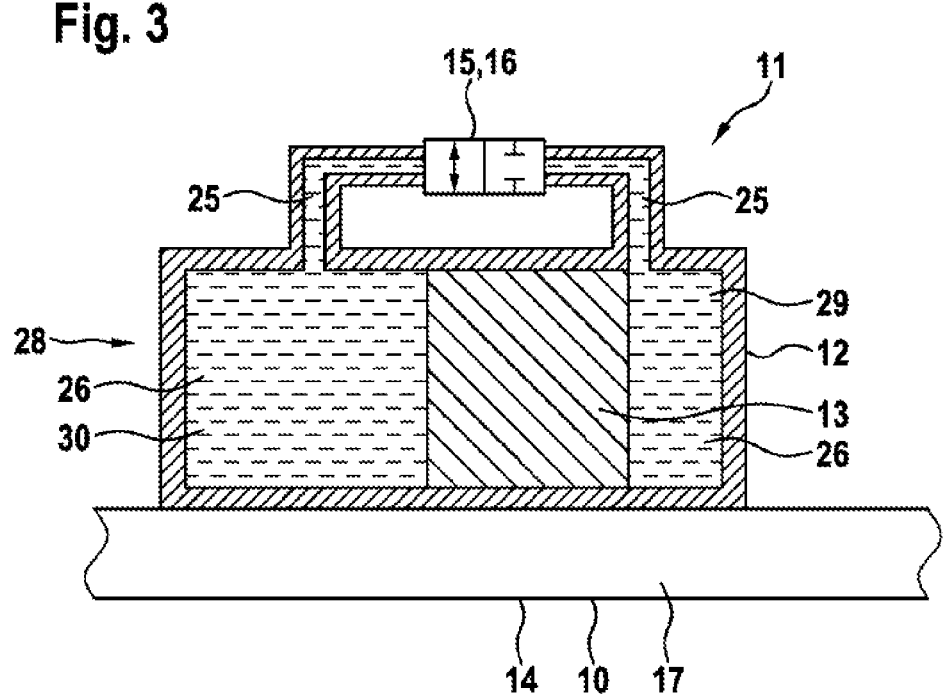
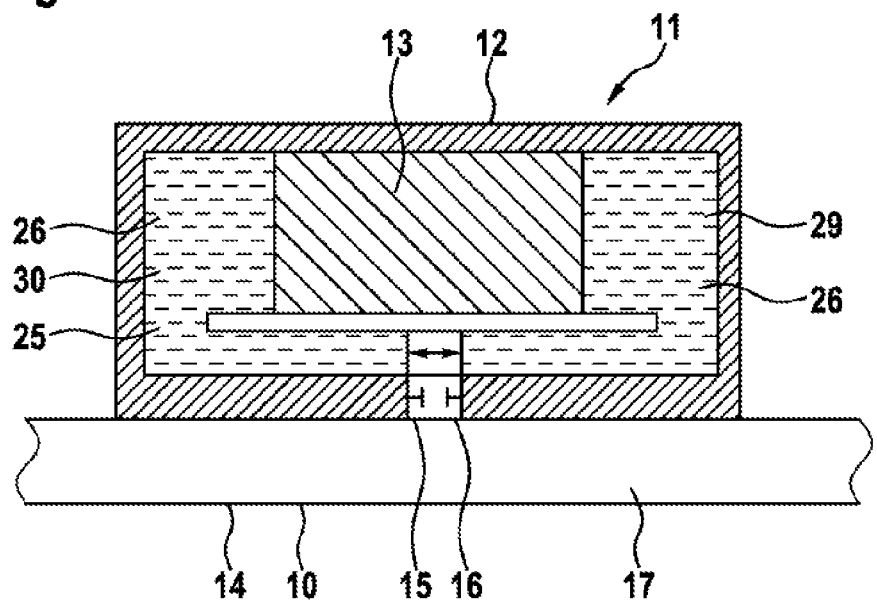

MASS-COUPLING ARRANGEMENT FOR A VEHICLE

BACKGROUND OF THE INVENTION

The present invention relates to a mass-coupling arrangement for a vehicle.

From the prior art it is generally known to drive vehicles solely by means of an electric motor (electric vehicle) or by means of a combination of an electric motor and a drive machine of some other type (hybrid drive). In this context, the electrical energy which is necessary to drive the electric motor is stored in an electrical energy store such as e.g. a battery or an accumulator. The battery can be charged from time to time by means of an external electrical energy source and can serve to store recovered braking energy (recuperation energy).

In known structural configurations of electrically driven vehicles, the battery makes up a disproportionately large portion of the mass compared to the vehicle as a whole. In order to achieve a large range, the electrically driven vehicles are equipped with large batteries which can have a mass of several 100 kg (for example 100 to 400 kg). Therefore, the battery forms up to 30% of the total mass of the vehicle. As a result of the large mass, in the case of an accident the battery constitutes a potential danger. The attachment of the battery to the bodywork of the motor vehicle therefore plays an important role. Known concepts for electrically driven vehicles provide the battery as a uniform rigid block in the region of the underfloor of the vehicle (ideally between the front axle and the rear axle). As a consequence, the battery contributes to lowering the overall center of gravity of the vehicle.

However, it is disadvantageous that in the event of a collision of the vehicle or of an impact of the vehicle large decelerations can occur which, owing to the large mass of the traction batteries, then exert a large shearing force on the vehicle bodywork.

Damping the movement of the vehicle battery in comparison with the rest of the vehicle plays a significant role in the stability behavior of the vehicle in the event of a collision. During a collision—or generally during an unusual deceleration process such as, for example, an emergency braking operation—all the objects with mass of the vehicle or in the interior of the vehicle are subjected to abrupt accelerations which require an acceleration force which is greater the larger the mass of the decelerated object. The time profiles of the acceleration of the individual objects, their respective contribution to the mass, their kinematics and the energetic proportion of the total balance of the kinetic energy are therefore decisive for the time profile of the acceleration of the overall system.

In order to influence the time profile of the acceleration of the overall system favorably in the case of a collision of a vehicle, connecting systems or mass-coupling arrangements between a vehicle battery and the vehicle bodywork are known which temporarily mechanically uncouple the battery, including its carrier structure, from the vehicle bodywork in a controlled fashion. For example, document DE 197 38 620 C1 thus describes a mass-coupling arrangement or a battery-retaining system for vehicle batteries in which all the guide elements at least partially permit a movement of the vehicle battery in the event of an impact. The uncoupling ensures that the mass of the battery passes through its own movement trajectory during the collision of the vehicle, and as a result the acceleration forces acting on the battery are configured in a more favorable way. It is a disadvantage of the specified prior art that the securing force with which the battery is secured in the battery-retaining system is constant and cannot be varied in strength or switched off completely at any time.

SUMMARY OF THE INVENTION

The object of the invention is to specify a mass-coupling arrangement in which the uncoupling within the mass-coupling arrangement is performed in an improved way.

The method according to the invention for operating a mass-coupling arrangement has the advantage that the uncoupling within the mass-coupling arrangement can be performed in an improved way.

For this purpose, there is provision according to the invention that the mass-coupling arrangement has a mass-holding element for holding an object of mass, wherein the mass-holding element is filled at least partially with a fluid to which the object of mass is connected, at least one coupling means which is configured to couple the object of mass by means of the fluid to the mass-holding element and therefore to a vehicle structure which is fixedly connected to the vehicle and/or at least partially decouple it from the vehicle structure, a hydraulic line which connects the coupling means to the fluid, wherein the object of mass compresses the fluid in the event of a crash and the coupling means directs the fluid out of the mass-holding element or diverts it in the mass-holding element. By means of the method according to the invention, the crash pulse (the effective acceleration pulse which acts on the vehicle and the vehicle occupants) is adapted, in that the unlocking or uncoupling and selective braking of the object of mass, which can be a battery, is implemented by a regulated hydraulic system. In this context, the force acting as a result of the deceleration of the crash acts directly or indirectly on the fluid in that the object of mass compresses the fluid in the event of a crash. Since a fluid is very largely incompressible, it is directed, under pressure in the event of a crash, in a targeted fashion out of the mass-holding element by means of the coupling means or is diverted in the mass-holding element (for example in a separate chamber).

The function of the coupling means is advantageously implemented by means of a valve. The object of mass is mounted in the mass-holding element. The space remaining in the mass-holding element is filled by the fluid which is very largely incompressible. If the valve is closed, the object of mass (e.g. a battery) cannot shift and is therefore fixedly coupled to the vehicle structure of the vehicle. In the event of a crash, the object of mass moves in the direction of the crash and compresses the fluid. As a result of the opening of the valve, the fluid which is under pressure can be directed out of the mass-holding element via the hydraulic line or can be diverted via the hydraulic line in the mass-holding element, as a result of which the object of mass is at least partially advantageously decoupled from the vehicle structure.

In a further advantageous embodiment of the method, the valve is embodied as a proportional valve. A proportional valve is a continuously operated valve or regulating valve which by using a proportional magnet not only permits discrete switching positions but also makes a continuous transition of the valve opening possible. A proportional valve is advantageous in this method since variable volume flows are present. The proportional valve regulates the variable through-flow of the fluid in the event of a crash and correspondingly acts as a spring-damper element which permits selective braking of the battery or of the object of mass.

According to a further embodiment of the method, the object of mass is connected to a piston by means of which the fluid is compressed. The piston advantageously runs in a hydraulic cylinder which is filled with the fluid. Both the piston and the hydraulic cylinder can have any desired dimensions in their diameter in contrast to the battery, as a result of which installation space and weight advantages are obtained.

Furthermore, it is advantageous that the fluid is not flammable. Since in the event of a crash flammable fuel can escape or in the case of a hybrid vehicle or electric vehicle the battery can catch fire, the fluid with which the battery is in contact should also advantageously be prevented from catching fire.

In a further advantageous embodiment, the fluid is biologically degradable. If the fluid is not diverted in the mass-holding element or collected in some other way (container, balloon, etc.), but instead allowed to escape into the environment, it is appropriate for reasons of environmental protection that the fluid be biologically degradable.

The battery in hybrid vehicles and electric vehicles is generally cooled in order to conduct away heat. The cooling fluid which is used for this purpose can advantageously be used not only for cooling but also for coupling and decoupling the object of mass/the battery.

In a further advantageous embodiment, the fluid is a non-Newtonian fluid. Non-Newtonian fluids are an alternative to using proportional valves for controlling the force acting on the battery pack. Instead, the non-Newtonian fluids and simply valves are used. The viscosity of fluids which are suitable for this method increases as a result of mechanical loading (thixotropy). Therefore, the free flight phase or the decoupled state of the object of mass/the battery/the battery pack at the start of the deceleration process which is necessary in the event of a crash can be achieved using a thixotropic fluid. In the case of an impact at high speed, the viscosity drops as a result of the mechanical stress which occurs, and a large degree of decoupling between the battery and the vehicle structure occurs. As a result of the additional use of a rheopex fluid (increase in the viscosity as a result of mechanical loading), re-coupling to the vehicle can occur with increased force for the second phase of the deceleration process.

According to a further embodiment of the method, the mass-coupling arrangement is advantageously assigned a precrash detection device. This precrash detection device is designed to acquire and evaluate sensor data and pass on results of the evaluation to a control device which advantageously controls the coupling means. As a result of the precrash detection, an existing impact situation or one which will occur in the near future can be determined with such precision that a strategy for controlling the coupling means can be derived therefrom. In order to determine the impact characteristic, algorithms can be used such as are customary, for example, in the field of airbags. The resulting control of the coupling means can be carried out by means of a set of rules. For example, in the event of an impact with an object the mass (object of mass, battery, battery pack) is preferably decoupled at the start of the impact, in order to obtain relatively high deceleration values.

In a further embodiment of the method, the mass-coupling arrangement is configured as a battery carrier arrangement, wherein the battery of the motor vehicle constitutes the object of mass.

Of course, the features which are mentioned above and those which are still to be explained below can be used not only in the respectively disclosed combination but also in other combinations or alone without departing from the scope of the invention.

BRIEF DESCRIPTION OF THE DRAWINGS

FIG. 3 shows in schematic form a further embodiment of the battery carrier arrangement; and FIG. 4 shows in schematic form a further embodiment of the battery carrier arrangement.

DETAILED DESCRIPTION

Figure 1:
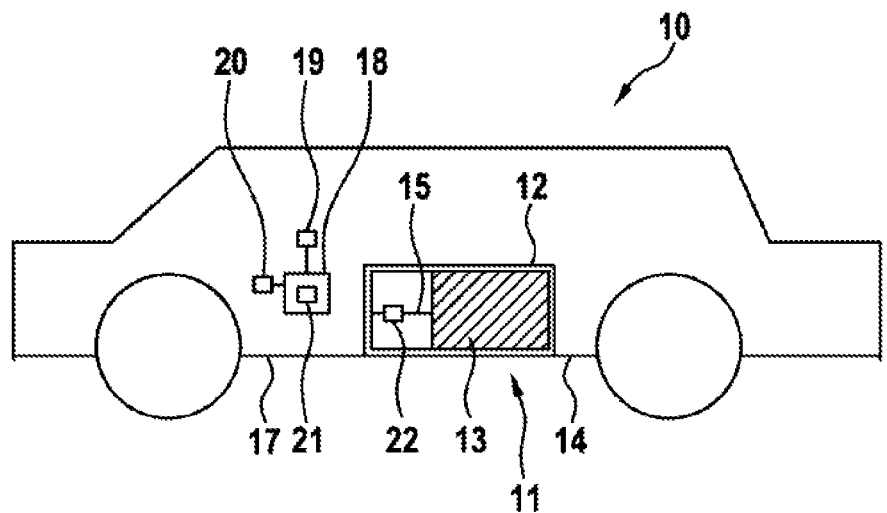
FIG. 1 shows in schematic form a motor vehicle having a battery carrier arrangement as an exemplary embodiment of a mass-coupling arrangement.

The mass-coupling arrangement 11 according to the invention will be explained in more detail below on the basis of a motor vehicle 10 which is illustrated schematically in FIG. 1. An arrangement which has a mass-holding element 12 (also referred to as a battery-holding element 12) is selected as an embodiment of the mass-coupling arrangement, said mass-holding element 12 being designed to hold an object of mass 13 (preferably a battery 13). In this context, the object of mass 13 is coupled to the mass-holding element 12. Of course, the mass-coupling arrangement 11 according to the invention can also be used in other vehicles such as e.g. electrically driven two-wheeled vehicles. Likewise, instead of the battery 13 as an object of mass 13 it is also possible to define other singular masses in the vehicle as an object of mass. For example, the described principle of action can also be applied to a motor as an object of mass.

Furthermore, the mass-coupling arrangement 11 has coupling means 15 and a damping element 22. In the usual case, the mass-holding element 12 is fixedly coupled to a bodywork 17 or vehicle structure 17 of the motor vehicle 10 using the coupling means 15. In the event of an impact or an imminent impact, the mass-holding element 12 is at least partially decoupled from the bodywork by means of the coupling means 15. The described procedure is implemented by performing the coupling and decoupling by means of regulated hydraulics 28 or a hydraulic system 28.

The object of mass 13 or the battery 13 is in direct contact with a fluid 26. In the event of a crash, the force acting as a result of the deceleration of the crash, which moves the battery 13 in the direction of the crash, acts directly or indirectly on the fluid 26 and compresses it. Since the fluid 26 is very largely incompressible it is selectively released, since it is under pressure, to the outside from the mass-coupling arrangement, or diverted into another alternative chamber (not illustrated here) via a hydraulic line 25 and through a proportional valve 16 (regulating valve or continuously operating valve). The valve 16 implements here the function of the coupling element. If the valve 16 is closed, the object of mass 13 does not move in the incompressible fluid 26 and is therefore attached to the vehicle structure 17 of the vehicle 10. If the valve 16 is opened, the fluid 26 which is compressed in the event of a crash can escape, as a result of which the decoupling of the object of mass 13 from the vehicle structure 17 is implemented. In addition, the valve 16 also implements the function of a spring-damper element in that the through-flow can be configured variably by varying the valve opening of the valve 16 (regulating the variable through-flow).

When the hydraulic system 28 is open, the fluid 26 is directed into the surroundings—that is to say is guided outside the mass-holding element 12. In this context, the hydraulic fluid 26 is selected such that, firstly, it is not flammable, in order to prevent the risk of a fire. Secondly, the fluid 26 is biologically degradable in order to protect the environment.

Alternatively, a container (e.g. a balloon) can be positioned at the outlet of the valve 16 in order to ensure that the fluid is collected.

The decoupling mechanism can be combined with a precrash detection device. For this purpose, a precrash detection device 18 (referred to in simplified fashion as control device 18) is present. The control device 18 serves, in particular, to perform open-loop or closed-loop control of the valve 16. In addition, the control device 18 is electrically connected to a sensor arrangement 19. The sensor arrangement 19 has in turn a sensor system 20 and evaluation electronics 21. The sensor system 20 typically has an acceleration sensor and/or a pressure sensor. Since these sensors are typical airbag sensors, the evaluation of the data can be carried out by means of the airbag electronics. The evaluation electronics 21 can, however, also be implemented independently of the airbag electronics. Furthermore, the sensor system 20 can have predictive sensors. This comprises, in particular, laser-based sensors (LIDAR), radar and/or video sensors. In addition, the sensor system 20 can have a receiver unit which receives signals from a vehicle-to-vehicle (Car2Car) or vehicle-to-infrastructure (Car2Infrastructure) communication.

By using the sensor arrangement 19, an existing impact situation or one which will occur in the near future can be determined precisely. For this purpose, the signals which are made available by the various sensors of the sensor system 20 are combined with one another in the evaluation electronics 21 and evaluated. The results of this evaluation are passed on to the control device 18. The control device 18 subsequently controls the valve 16, by means of which, in the event of an impact or an immediately imminent impact, the mass-holding element 12, including the object of mass 13, is at least partially decoupled from the bodywork 17 or vehicle structure 17 of the motor vehicle 10 by the valve 16 being opened in a regulated fashion. The time profile of the decoupling of the mass-holding element 12 or the degree of coupling depends on the specific impact situation which is determined by the sensor arrangement 19. The decoupling of the mass-holding element 12 in the event of an impact occurs according to the stipulation that the loading of the vehicle occupants is reduced. The mass which is effective during the impact is influenced by the inventive decoupling of the mass-holding element 12. This in turn permits the impetus of the impact to be influenced. Therefore, the deceleration which acts on the entire vehicle 10 can be influenced using the mass-coupling arrangement 11 in such a way that the loading and therefore the risk of injury for the vehicle occupants is significantly reduced in comparison with a vehicle without such a system.

In order to be able to implement the hydraulic system 28 with minimum additional expenditure in terms of weight and costs, it is possible to have recourse to a fluid 26 which is already present in the system, such as, for example, the cooling fluid of the battery 13.

An alternative to the use of valves 16 as the coupling means 15 for controlling the force acting on the battery 13 is the use of non-Newtonian fluids whose viscosity increases (rheopexy) or decreases (thixotropy) as a result of mechanical loading. The necessary free flight phase in which the battery 13 is in the state in which it is decoupled from the vehicle 10 or the vehicle structure 17 can be achieved at the start of the deceleration process using thixotropic fluids. In the case of an impact at high speed, the viscosity of the fluid 26 drops as a result of the mechanical stress which occurs, and a large degree of decoupling from the battery pack 13 and the vehicle structure 17 occurs. As a result of the use of a rheopex fluid, re-coupling of the battery 13 to the vehicle 10 can occur with increased force for the second phase of the deceleration process.

Figure 2:
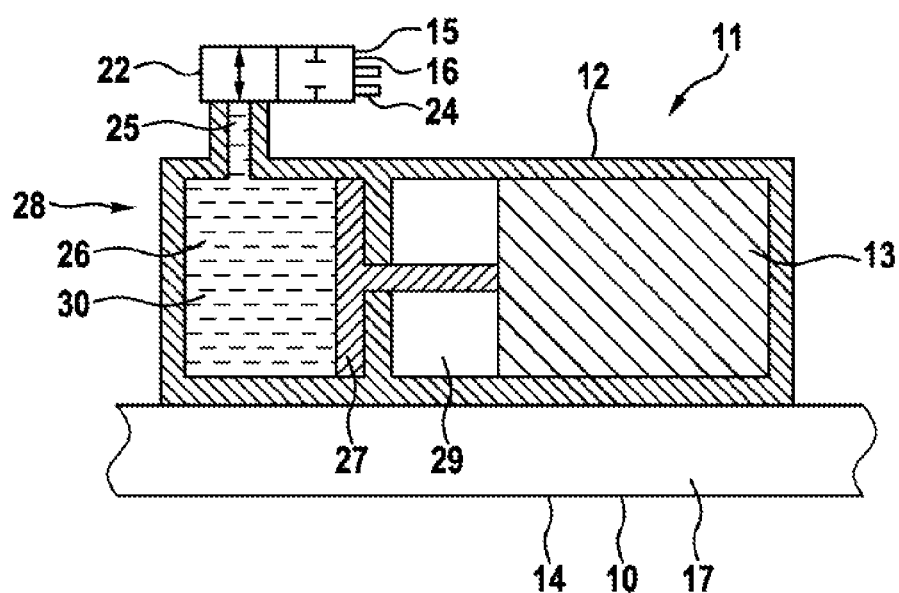
FIG. 2 shows in schematic form an embodiment of the battery carrier arrangement.

FIG. 2 shows in schematic form an embodiment of the mass-coupling arrangement 11. Identical elements to those in FIG. 1 are provided with the same reference numbers and are not explained in more detail.

The mass-coupling arrangement 11 has the mass-holding element 12 and the object of mass 13 (e.g. the battery 13) and a first chamber 29 and a second chamber 30. Furthermore, the mass-coupling arrangement 11 has at least one coupling means 15, which is preferably a valve 16. The battery 13 is connected to the piston 27 and is located in the first chamber 29. The piston 27 brings about the contact of the battery 13 with the fluid 26, wherein the fluid 26 is located in the second chamber 30. The second chamber 30 has a valve 16 and is connected to the chamber 30 via a line 25 or hydraulic line 25. The fluid 26 is incompressible, not flammable and biologically degradable. In the usual case, the valve 16 is closed, as a result of which the battery 13 is coupled to the vehicle structure 17. In the event of a crash, the battery 13 is accelerated in the direction of the crash and compresses the fluid 26 by means of the piston 27. The valve 16 is opened in a regulated fashion with a variable through-flow, with the result that the fluid 26 can flow out of the second chamber 30 of the mass-holding element 12 via the hydraulic line 25.

The piston and the cylinder (here the second chamber 30), in which the piston moves, could be given smaller dimensions compared to the first chamber 29 in which the battery moves, and also could be smaller with respect to the diameter.

FIG. 3 shows a further embodiment of the mass-coupling arrangement 11. Identical elements to those in FIG. 2 are provided with the same reference numbers and are not explained in more detail. In this example, the hydraulic line 25 connects the first chamber 29 to the second chamber 30 of the mass-holding element. The system is therefore a closed hydraulic system 28. In the usual case, the valve 16 is closed. In the event of a crash, the battery 13 is accelerated in the direction of the crash and compresses the fluid 26. The valve 16 is opened in a regulated fashion with a variable through-flow, with the result that the fluid 26 is diverted out of the second chamber 30 of the mass-holding element 12 into the first chamber 29 via the hydraulic line 25, and is therefore merely displaced.

In FIG. 4 a further embodiment of the mass-coupling arrangement 11 is shown. Identical elements to those in FIG. 2 are provided with the same reference numbers and are not explained in more detail. In this variant, the hydraulic line 25 has been repositioned further into the mass-holding element 12. The advantages here lie in the particularly compact design. The battery 13 lies in the center in the mass-holding element 12, as a result of which a first chamber is produced next to the battery 13 in the direction of travel, and a second chamber 30 is produced in the direction opposed to the direction of travel. The first and second chambers 29 and 30 are connected to one another by means of a hydraulic line 25 or a duct 25. This duct 25 can act in a purely passive—that is to say non-regulated fashion—or else can be formed by means of an additively cross-section-regulated constriction point. Furthermore, as in the previous exemplary embodiments, it is also possible to close or open the duct 25 by means of a valve 16. In the usual case, the valve 16 is closed. In the event of a crash, the battery 13 is accelerated in the direction of the crash and compresses the fluid 26. The valve 16 is opened in a regulated fashion with a variable through-flow, with the result that the fluid 26 is diverted out of the second chamber 30 of the mass-holding element 12 into the first chamber 29 via the hydraulic line 25, and is therefore merely displaced.

Figure 5:
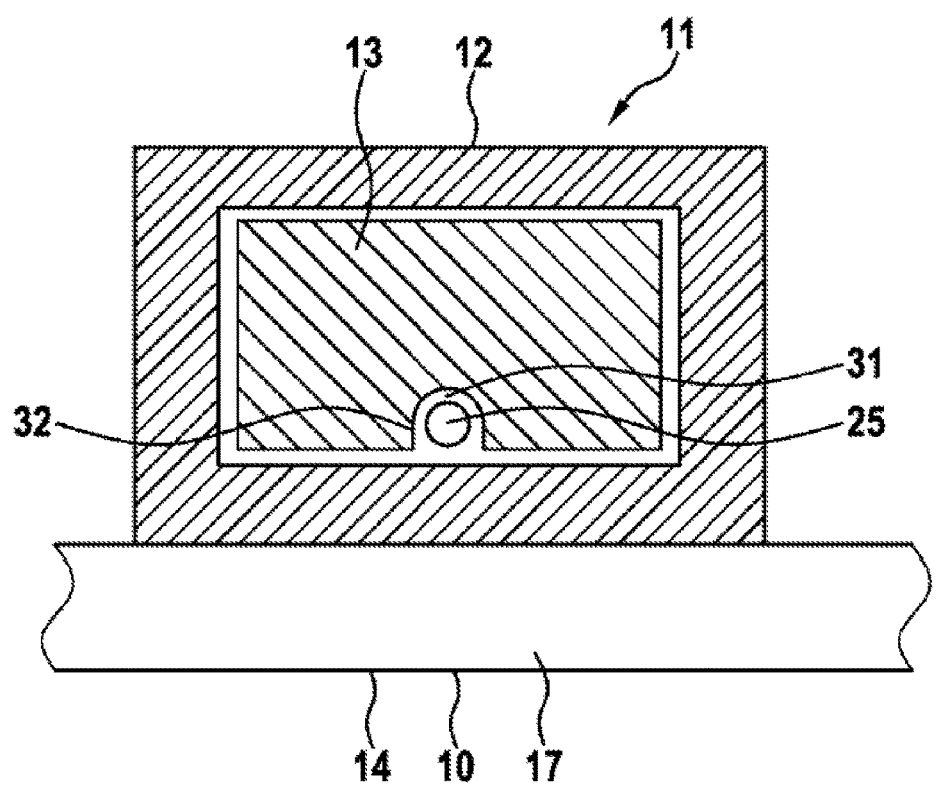
FIG. 5 shows in schematic form an alternative illustration of the embodiment of the battery carrier arrangement from FIG. 4.

FIG. 5 shows again the exemplary embodiment from FIG. 4 of the mass-coupling arrangement 11. Identical elements to those in FIG. 2 are provided with the same reference numbers and are not explained in more detail. For the case in which a type of guide means 31 is required for the battery 13, the duct 25 or the hydraulic line 25 can have a defined geometry. The battery 13 can have a depression or groove 32 in which the duct 25 or the hydraulic line 25 is guided. The guide means 31 can be part of the mass-holding element 12 or else can be embodied by means of additively inserted rails.

The invention claimed is:

1. A method for operating a mass-coupling arrangement (11) for a vehicle (10), the mass-coupling arrangement having a mass-holding element (12) for holding an object of mass (13), wherein the mass-holding element (12) is filled at least partially with a fluid (26) to which the object of mass (13) is connected, the mass-coupling arrangement having at least one coupling means (15) which is configured to couple the object of mass (13) by means of the fluid (26) to the mass-holding element (12) and therefore to a vehicle structure (17) which is fixedly connected to the vehicle (10) and/or at least partially decouple the object of mass from the vehicle structure (17), and the mass-coupling arrangement having a hydraulic line (25) which connects the coupling means (15) to the fluid (26), the method comprising using the object of mass (13) to pressurize the fluid (26) in the event of a crash, and using the coupling means (15) to direct the fluid (26) out of the mass-holding element (12) or to divert the fluid in the mass-holding element (12).

2. The method as claimed in claim 1, characterized in that the coupling means (15) is a valve.

3. The method as claimed in claim 2, characterized in that the valve (15) is a proportional valve.

4. The method as claimed in claim 2, characterized in that the object of mass (13) is connected to a piston (27) by means of which the fluid (26) is pressurized.

5. The method as claimed in claim 1, characterized in that the fluid (26) is not flammable.

6. The method as claimed in claim 1, characterized in that the fluid (26) is biologically degradable.

7. The method as claimed in claim 1, characterized in that the fluid (26) is cooling fluid of the battery.

8. The method as claimed in claim 1, characterized in that the fluid (26) is a non-Newtonian fluid.

9. The method as claimed in claim 1, characterized in that a controller of the coupling means (15) is coupled to a precrash detection device.

10. The method as claimed in claim 1, characterized in that the object of mass (13) is a battery.

* * * * *